United States Patent Office.

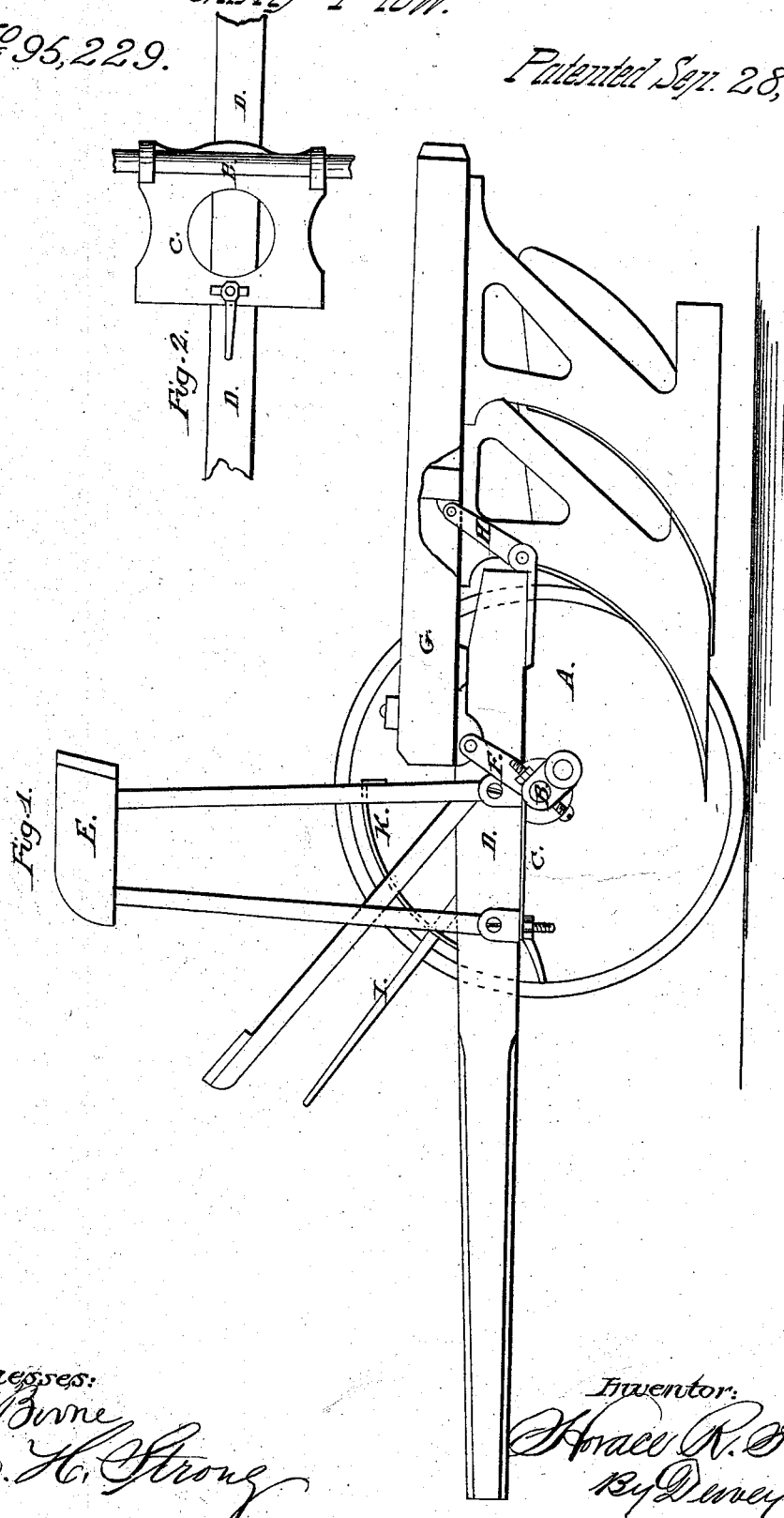

HORACE R. HUIE, OF HAYWARDS, ASSIGNOR TO LEONARD L. TREADWELL AND GEORGE R. CARTER, OF SAN FRANCISCO, CALIFORNIA.

Letters Patent No. 95,229, dated September 28, 1869.

IMPROVEMENT IN GANG-PLOWS.

The Schedule referred to in these Letters Patent and making part of the same.

*To all whom it may concern:*

Be it known that I, HORACE R. HUIE, of Haywards, county of Alameda, State of California, have invented an Improved Gang-Plow; and I do hereby declare the following description and accompanying drawings are sufficient to enable any person skilled in the art or science to which it most nearly appertains, to make and use my said invention or improvement without further invention or experiment.

My invention relates to that class of gang-plows in which the plow-frame is attached to a pair of wheels, or truck; and It consists in connecting the frame with the trucks in such a manner that the point of the plows, when they are lifted out of the ground, will be raised first, thus causing them to be disengaged gradually, instead of being lifted vertically, and thus carrying with them a weight of earth, to be lifted also.

It also consists in a novel manner of attaching the pole and seat of the plow to the axle, whereby strength and firmness are attained.

To more fully explain my invention, reference is had to the accompanying drawings, and letters marked thereon, forming a part of this specification, in which—

Figure 1 is a side view.

Figure 2 is a view of the plate which supports the seat and pole.

A A are the two wheels of a truck, one of the wheels A being placed upon the crank-end of the axle B.

To the axle is attached one end of a metal plate, C, by some suitable means, upon which the plow-beam D rests, the front end of the plate being bolted to the beam on the under side.

The seat E is built upon the plate C, the four standards resting upon the four corners of the plate.

Secured to the axle B, on each side of the plate C, are arms F F, the opposite ends of which are attached loosely to the front ends of the timbers G G of the plow-frame.

The pole or beam D extends back between the two timbers G G, its rear end being connected with the frame by a link, H, which is hinged both to the beam and frame, so as to turn as the frame is raised.

A lever, I, is secured to the arm F, by moving which the frame is raised and lowered, being confined in the rack K at any desired position.

The peculiar connection of the pole and trucks is such that when the lever I is moved down the rack, the front end of the frame is raised first, thus lifting the points of the plows, and causing them to emerge gradually, without carrying with them an extra weight of earth.

The length of the arms F F and link H should be equal, so that when the arms are raised or turned by the lever, so as to elevate the front end of the frame, the rear end will be also raised, being caused to do so by the forward motion of the frame, but will not be moved until the front end has been lifted a short distance, in order to carry the plows out of the ground before the entire frame is elevated.

One of the advantages claimed for this plow is its simplicity, consisting, as it does, of few parts, which are not liable to get out of order, and, on this account, rendering it economical, while it will do equally as good work as any of the plows of a more complicated and costly character.

Having thus described my invention,

What I claim, and desire to secure by Letters Patent, is—

1. Attaching the rear end of the plow-beam D to the rear end of the plow-frame, by means of a link, H, substantially as herein described.

2. The metal plate C, or equivalent device, secured to the axle B and pole D, in the manner above described, for the purpose set forth.

In witness whereof, I have hereunto set my hand and seal.

HORACE R. HUIE. [L. S.]

Witnesses:
 WILLIAM STANIFORTH,
 J. L. BOONE.